United States Patent
Seo et al.

(10) Patent No.: US 10,887,070 B2
(45) Date of Patent: Jan. 5, 2021

(54) METHOD FOR RECEIVING MULTICAST SIGNAL IN WIRELESS COMMUNICATION SYSTEM AND APPARATUS THEREFOR

(71) Applicant: LG Electronics Inc., Seoul (KR)

(72) Inventors: Hanbyul Seo, Seoul (KR); Kijun Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 191 days.

(21) Appl. No.: 16/082,824

(22) PCT Filed: Mar. 9, 2017

(86) PCT No.: PCT/KR2017/002574
§ 371 (c)(1),
(2) Date: Sep. 6, 2018

(87) PCT Pub. No.: WO2017/155332
PCT Pub. Date: Sep. 14, 2017

(65) Prior Publication Data
US 2019/0052439 A1 Feb. 14, 2019

Related U.S. Application Data

(60) Provisional application No. 62/306,009, filed on Mar. 9, 2016.

(51) Int. Cl.
*H04L 5/00* (2006.01)
*H04W 28/04* (2009.01)
(Continued)

(52) U.S. Cl.
CPC .......... *H04L 5/0055* (2013.01); *H04L 1/1812* (2013.01); *H04L 5/0048* (2013.01);
(Continued)

(58) Field of Classification Search
CPC ... H04L 5/0055; H04L 1/1812; H04L 5/0048; H04W 28/04; H04W 52/48; H04W 72/0473; H04W 72/12
(Continued)

(56) References Cited

U.S. PATENT DOCUMENTS 7,483,710 B2 1/2009 Kitazawa et al.
2006/0007887 A1* 1/2006 Kwon .................. H04L 1/1867
370/329
(Continued)

FOREIGN PATENT DOCUMENTS

| KR | 10-2009-0015253 | 2/2009 |
| KR | 10-2009-0085549 | 8/2009 |
| KR | 10-2011-0089860 | 8/2011 |

OTHER PUBLICATIONS

International Search Report in International Application No. PCT/KR2017/002574, dated Jul. 21, 2017, 19 pages. (with English Translation).

*Primary Examiner* — Christopher R Crompton
(74) *Attorney, Agent, or Firm* — Fish & Richardson P.C.

(57) ABSTRACT

Disclosed in the present application is a method for receiving by a terminal a multicast signal in a wireless communication system. Specifically, the method comprises the steps of: attempting to receive, from a network, a control signal for scheduling a multicast signal; receiving the multicast signal from the network and performing decoding on the basis of the control signal; and transmitting a data negative acknowledgement signal to the network when the decoding of the multicast signal fails, wherein a control negative acknowledgement signal is transmitted to the network when the reception of the control signal has failed.

11 Claims, 8 Drawing Sheets

(51) Int. Cl.
*H04W 72/12* (2009.01)
*H04L 1/18* (2006.01)
*H04W 52/48* (2009.01)
*H04W 72/04* (2009.01)

(52) U.S. Cl.
CPC .......... *H04W 28/04* (2013.01); *H04W 52/48* (2013.01); *H04W 72/0473* (2013.01); *H04W 72/12* (2013.01)

(58) Field of Classification Search
USPC ....................................................... 370/329
See application file for complete search history.

(56) References Cited

U.S. PATENT DOCUMENTS

| | | | |
|---|---|---|---|
| 2008/0168321 A1 | 7/2008 | Lim et al. | |
| 2009/0207771 A1* | 8/2009 | Lindskog | H04L 12/1868 370/312 |
| 2010/0290383 A1* | 11/2010 | Wu | H04L 1/1867 370/312 |
| 2011/0261774 A1* | 10/2011 | Lunttila | H04L 1/0088 370/329 |
| 2016/0119762 A1* | 4/2016 | Zhu | H04W 4/06 370/312 |
| 2017/0303212 A1* | 10/2017 | Takeda | H04W 72/04 |
| 2018/0367261 A1* | 12/2018 | Gonzalves Serrano | H04L 1/0027 |

\* cited by examiner

(A) CONTROL-PLANE PROTOCOL STACK (B) USER-PLANE PROTOCOL STACK

FIG. 8

METHOD FOR RECEIVING MULTICAST SIGNAL IN WIRELESS COMMUNICATION SYSTEM AND APPARATUS THEREFOR

CROSS-REFERENCE TO RELATED APPLICATIONS

This application is a National Stage application under 35 U.S.C. § 371 of International Application No. PCT/KR2017/002574, filed on Mar. 9, 2017, which claims the benefit of U.S. Provisional Application No. 62/306,009, filed on Mar. 9, 2016. The disclosures of the prior applications are incorporated by reference in their entirety.

TECHNICAL FIELD

The present invention relates to a wireless communication system, and more particularly, to a method for receiving a multicast signal in a wireless communication system and an apparatus therefor.

BACKGROUND ART

3GPP LTE (3rd generation partnership project long term evolution hereinafter abbreviated LTE) communication system is schematically explained as an example of a wireless communication system to which the present invention is applicable.

Figure 1:
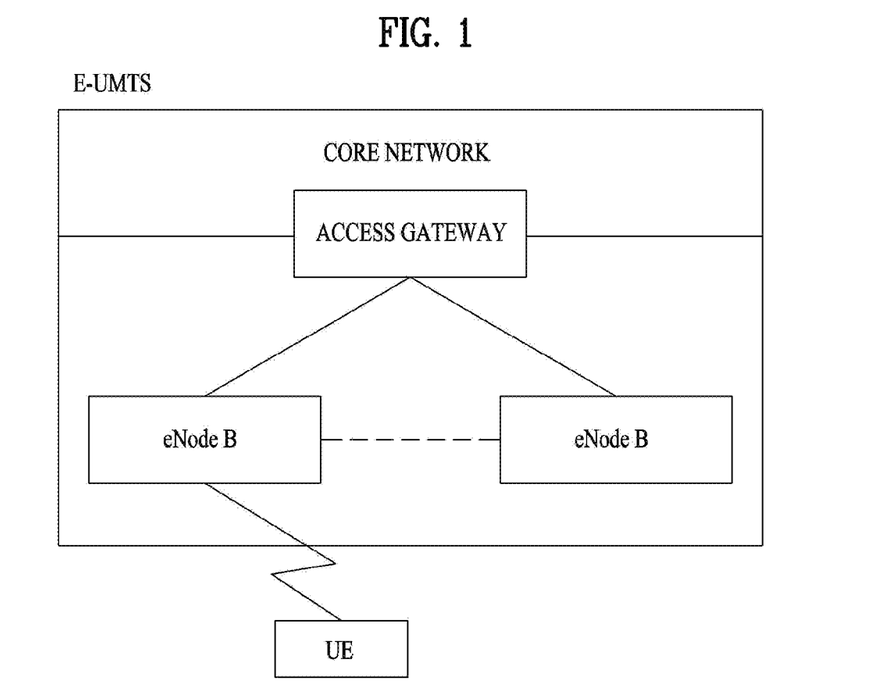
FIG. 1 is a diagram schematically illustrating a network structure of an E-UMTS as an exemplary radio communication system.

FIG. 1 is a schematic diagram of E-UMTS network structure as one example of a wireless communication system. E-UMTS (evolved universal mobile telecommunications system) is a system evolved from a conventional UMTS (universal mobile telecommunications system). Currently, basic standardization works for the E-UMTS are in progress by 3GPP. E-UMTS is called LTE system in general. Detailed contents for the technical specifications of UMTS and E-UMTS refers to release 7 and release 8 of "3rd generation partnership project; technical specification group radio access network", respectively.

Referring to FIG. 1, E-UMTS includes a user equipment (UE), an eNode B (eNB), and an access gateway (hereinafter abbreviated AG) connected to an external network in a manner of being situated at the end of a network (E-UTRAN). The eNode B may be able to simultaneously transmit multi data streams for a broadcast service, a multicast service and/or a unicast service.

One eNode B contains at least one cell. The cell provides a downlink transmission service or an uplink transmission service to a plurality of user equipments by being set to one of 1.25 MHz, 2.5 MHz, 5 MHz, 10 MHz, 15 MHz, and 20 MHz of bandwidths. Different cells can be configured to provide corresponding bandwidths, respectively. An eNode B controls data transmissions/receptions to/from a plurality of the user equipments. For a downlink (hereinafter abbreviated DL) data, the eNode B informs a corresponding user equipment of time/frequency region on which data is transmitted, coding, data size, HARQ (hybrid automatic repeat and request) related information and the like by transmitting DL scheduling information. And, for an uplink (hereinafter abbreviated UL) data, the eNode B informs a corresponding user equipment of time/frequency region usable by the corresponding user equipment, coding, data size, HARQ-related information and the like by transmitting UL scheduling information to the corresponding user equipment. Interfaces for user-traffic transmission or control traffic transmission may be used between eNode Bs. A core network (CN) consists of an AG (access gateway) and a network node for user registration of a user equipment and the like. The AG manages a mobility of the user equipment by a unit of TA (tracking area) consisting of a plurality of cells.

Wireless communication technologies have been developed up to LTE based on WCDMA. Yet, the ongoing demands and expectations of users and service providers are consistently increasing. Moreover, since different kinds of radio access technologies are continuously developed, a new technological evolution is required to have a future competitiveness. Cost reduction per bit, service availability increase, flexible frequency band use, simple structure/open interface and reasonable power consumption of user equipment and the like are required for the future competitiveness.

DISCLOSURE

Technical Problem

Based on the aforementioned discussion, an object of the present invention is to provide a method for receiving a multicast signal in a wireless communication system and an apparatus therefor.

Technical Solution

A method for receiving by a user equipment (UE) a multicast signal in a wireless communication system according to one aspect of the present invention comprises the steps of attempting to receive, from a network, a control signal for scheduling a multicast signal; receiving the multicast signal from the network and performing decoding on the basis of the control signal; and transmitting a data negative acknowledgement (NACK) signal to the network when the decoding of the multicast signal fails, wherein a control NACK signal is transmitted to the network when reception of the control signal has failed.

Preferably, the method further comprises the step of receiving information on a common resource for transmitting the data NACK signal and the control NACK signal from the network, wherein the data NACK signal and the control NACK signal may be transmitted to the network through the common resource.

Preferably, the control NACK signal and the data NACK signal may be transmitted to the network after retransmission of the multicast signal is performed as much as a preset number of times.

More preferably, a transmission power of the control NACK signal may be configured to be higher than that of the data NACK signal. In this case, transmission powers of the control NACK signal and the data NACK signal may be increased in accordance with retransmission times of the multicast signal.

Meanwhile, a user equipment (UE) in a wireless communication system according to one aspect of the present invention comprises a wireless communication module; and a processor connected with the wireless communication module, attempting to receive, from a network, a control signal for scheduling a multicast signal, receiving the multicast signal from the network and performing decoding on the basis of the control signal, and transmitting a data negative acknowledgement (NACK) signal to the network when the decoding of the multicast signal fails, wherein the processor transmits a control NACK signal to the network when reception of the control signal has failed.

Preferably, the processor may receive information on a common resource for transmitting the data NACK signal and the control NACK signal from the network, and may transmit the data NACK signal and the control NACK signal to the network through the common resource.

Preferably, the processor may transmit the control NACK signal and the data NACK signal to the network after retransmission of the multicast signal is performed as much as a preset number of times.

More preferably, the processor may configure a transmission power of the control NACK signal to be higher than that of the data NACK signal. In this case, the processor may increase transmission powers of the control NACK signal and the data NACK signal in accordance with retransmission times of the multicast signal.

Additionally, the control signal may include information indicating absence of a multicast channel transmitted from the network.

Advantageous Effects

According to the embodiment of the present invention, when an error occurs in packets transmitted through a multicast channel in a wireless communication system, efficiency recovery of the error may be performed, whereby reliability may be enhanced.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

BEST MODE FOR CARRYING OUT THE INVENTION

The configuration, operation and other features of the present invention will be understood by the embodiments of the present invention described with reference to the accompanying drawings. The following embodiments are examples of applying the technical features of the present invention to a 3rd Generation Partnership Project (3GPP) system.

Although the embodiments of the present invention will be described based on an LTE system and an LTE-advanced (LTE-A) system, the LTE system and the LTE-A system are purely exemplary and the embodiments of the present invention can be applied to any communication system corresponding to the aforementioned definition. In the present disclosure, a base station (eNB) may be used as a broad meaning including a remote radio head (RRH), an eNB, a transmission point (TP), a reception point (RP), a relay, etc.

Figure 2:
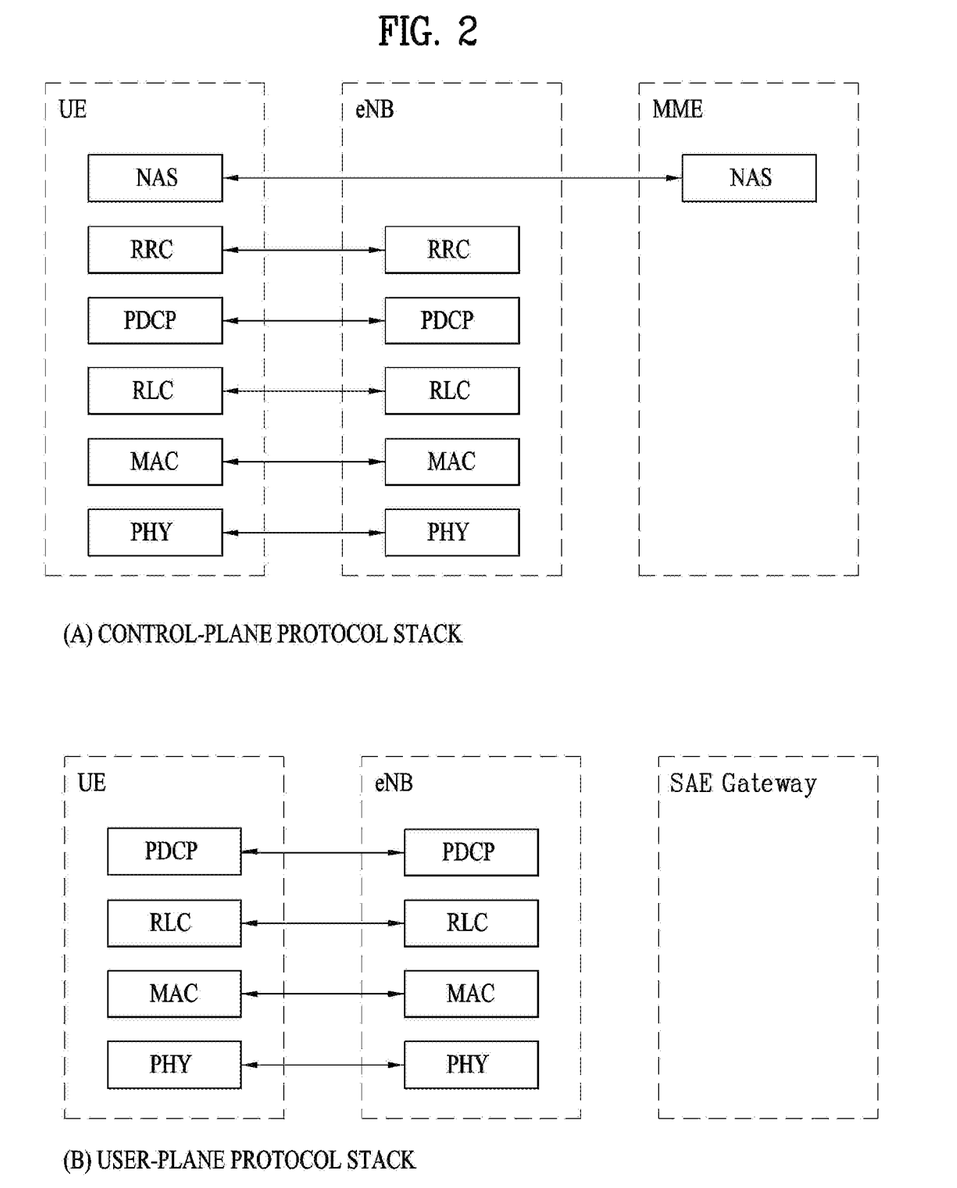
FIG. 2 is a diagram illustrating structures of a control plane and a user plane of a radio interface protocol between a UE and an E-UTRAN based on the 3GPP radio access network specification.

FIG. 2 is a diagram illustrating structures of a control plane and a user plane of a radio interface protocol between a UE and an E-UTRAN based on 3GPP radio access network specifications. The control plane refers to a path used for transmission of control messages, which is used by the UE and the network to manage a call. The user plane refers to a path in which data generated in an application layer, e.g. voice data or Internet packet data, is transmitted.

A physical layer of a first layer provides an information transfer service to an upper layer using a physical channel. The physical layer is connected to a media access control (MAC) layer of an upper layer via a transmission channel. Data is transmitted between the MAC layer and the physical layer via the transmission channel. Data is also transmitted between a physical layer of a transmitter and a physical layer of a receiver via a physical channel. The physical channel uses time and frequency as radio resources. Specifically, the physical channel is modulated using an orthogonal frequency division multiple Access (OFDMA) scheme in DL and is modulated using a single-carrier frequency division multiple access (SC-FDMA) scheme in UL.

The MAC layer of a second layer provides a service to a radio link control (RLC) layer of an upper layer via a logical channel. The RLC layer of the second layer supports reliable data transmission. The function of the RLC layer may be implemented by a functional block within the MAC layer. A packet data convergence protocol (PDCP) layer of the second layer performs a header compression function to reduce unnecessary control information for efficient transmission of an Internet protocol (IP) packet such as an IPv4 or IPv6 packet in a radio interface having a relatively narrow bandwidth.

A radio resource control (RRC) layer located at the bottommost portion of a third layer is defined only in the control plane. The RRC layer controls logical channels, transmission channels, and physical channels in relation to configuration, re-configuration, and release of radio bearers. A radio bearer refers to a service provided by the second layer to transmit data between the UE and the network. To this end, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode. A non-access stratum (NAS) layer located at an upper level of the RRC layer performs functions such as session management and mobility management.

A cell constructing an eNB is configured by one of bandwidths among 1.25, 2.5, 5, 10, 15, and 20 MHz and provides DL or UL transmission service to a plurality of UEs. Cells different from each other can be configured to provide a different bandwidth.

DL transmission channels for data transmission from the network to the UE include a broadcast channel (BCH) for transmitting system information, a paging channel (PCH) for transmitting paging messages, and a DL shared channel (SCH) for transmitting user traffic or control messages. Traffic or control messages of a DL multicast or broadcast service may be transmitted through the DL SCH or may be transmitted through an additional DL multicast channel (MCH). Meanwhile, UL transmission channels for data transmission from the UE to the network include a random access channel (RACH) for transmitting initial control messages and a UL SCH for transmitting user traffic or control messages. Logical channels, which are located at an upper level of the transmission channels and are mapped to the transmission channels, include a broadcast control channel (BCCH), a paging control channel (PCCH), a common control channel (CCCH), a multicast control channel (MCCH), and a multicast traffic channel (MTCH).

Figure 3:
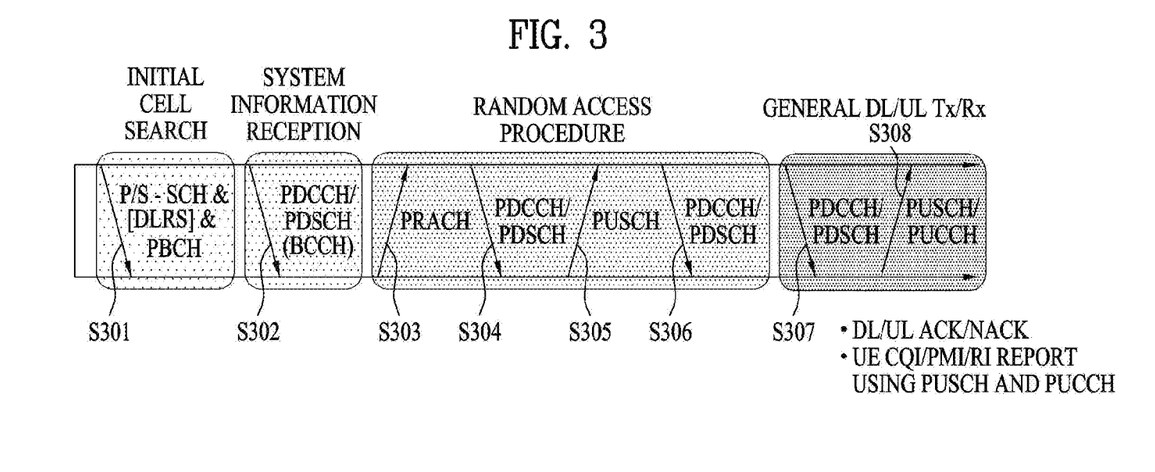
FIG. 3 is a diagram illustrating physical channels used in a 3GPP system and a general signal transmission method using the same.

FIG. 3 is a diagram illustrating physical channels used in a 3GPP system and a general signal transmission method using the same.

When power is turned on or the UE enters a new cell, the UE performs an initial cell search procedure such as acquisition of synchronization with an eNB (S301). To this end, the UE may adjust synchronization with the eNB by receiving a primary synchronization channel (P-SCH) and a secondary synchronization channel (S-SCH) from the eNB and acquire information such as a cell identity (ID). Thereafter, the UE may acquire broadcast information within the cell by receiving a physical broadcast channel from the eNB. In the initial cell search procedure, the UE may monitor a DL channel state by receiving a downlink reference signal (DL RS).

Upon completion of the initial cell search procedure, the UE may acquire more detailed system information by receiving a physical downlink control channel (PDCCH) and receiving a physical downlink shared channel (PDSCH) based on information carried on the PDCCH (S302).

Meanwhile, if the UE initially accesses the eNB or if radio resources for signal transmission to the eNB are not present, the UE may perform a random access procedure (S303 to S306) with the eNB. To this end, the UE may transmit a specific sequence through a physical random access channel (PRACH) as a preamble (S303 and S305) and receive a response message to the preamble through the PDCCH and the PDSCH associated with the PDCCH (S304 and S306). In the case of a contention-based random access procedure, the UE may additionally perform a contention resolution procedure.

After performing the above procedures, the UE may receive a PDCCH/PDSCH (S307) and transmit a physical uplink shared channel (PUSCH)/physical uplink control channel (PUCCH) (S308), as a general UL/DL signal transmission procedure. Especially, the UE receives downlink control information (DCI) through the PDCCH. The DCI includes control information such as resource allocation information for the UE and has different formats according to use purpose thereof.

Meanwhile, control information that the UE transmits to the eNB on UL or receives from the eNB on DL includes a DL/UL acknowledgment/negative acknowledgment (ACK/NACK) signal, a channel quality indicator (CQI), a precoding matrix index (PMI), a rank indicator (RI), and the like. In the 3GPP LTE system, the UE may transmit the control information such as CQI/PMI/RI through a PUSCH and/or a PUCCH.

Figure 4:
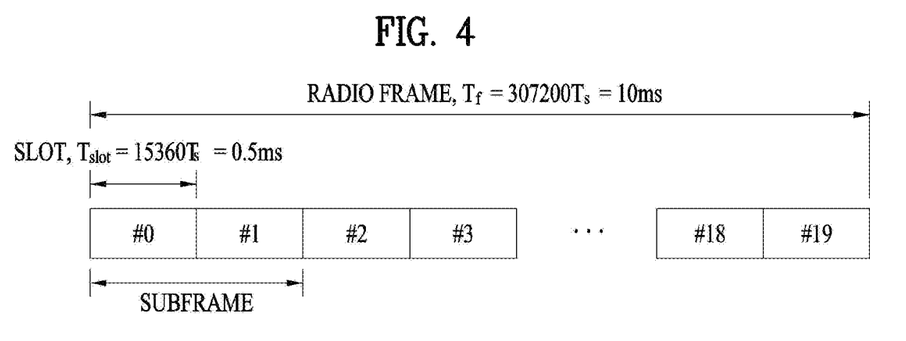
FIG. 4 is a diagram illustrating the structure of a radio frame used in an LTE system.

FIG. 4 is a diagram illustrating the structure of a radio frame used in an LTE system.

Referring to FIG. 4, the radio frame has a length of 10 ms (327200×Ts) and includes 10 equal-sized subframes. Each of the subframes has a length of 1 ms and includes two slots. Each slot has a length of 0.5 ms (15360 Ts). In this case, Ts denotes a sampling time represented by Ts=1/(15 kHz× 2048)=3.2552×10$^{-8}$ (about 33 ns). Each slot includes a plurality of OFDM symbols in the time domain and includes a plurality of resource blocks (RBs) in the frequency domain. In the LTE system, one RB includes 12 subcarriers×7 (or 6) OFDM symbols. A transmission time interval (TTI), which is a unit time for data transmission, may be determined in units of one or more subframes. The above-described structure of the radio frame is purely exemplary and various modifications may be made in the number of subframes included in a radio frame, the number of slots included in a subframe, or the number of OFDM symbols included in a slot.

Figure 5:
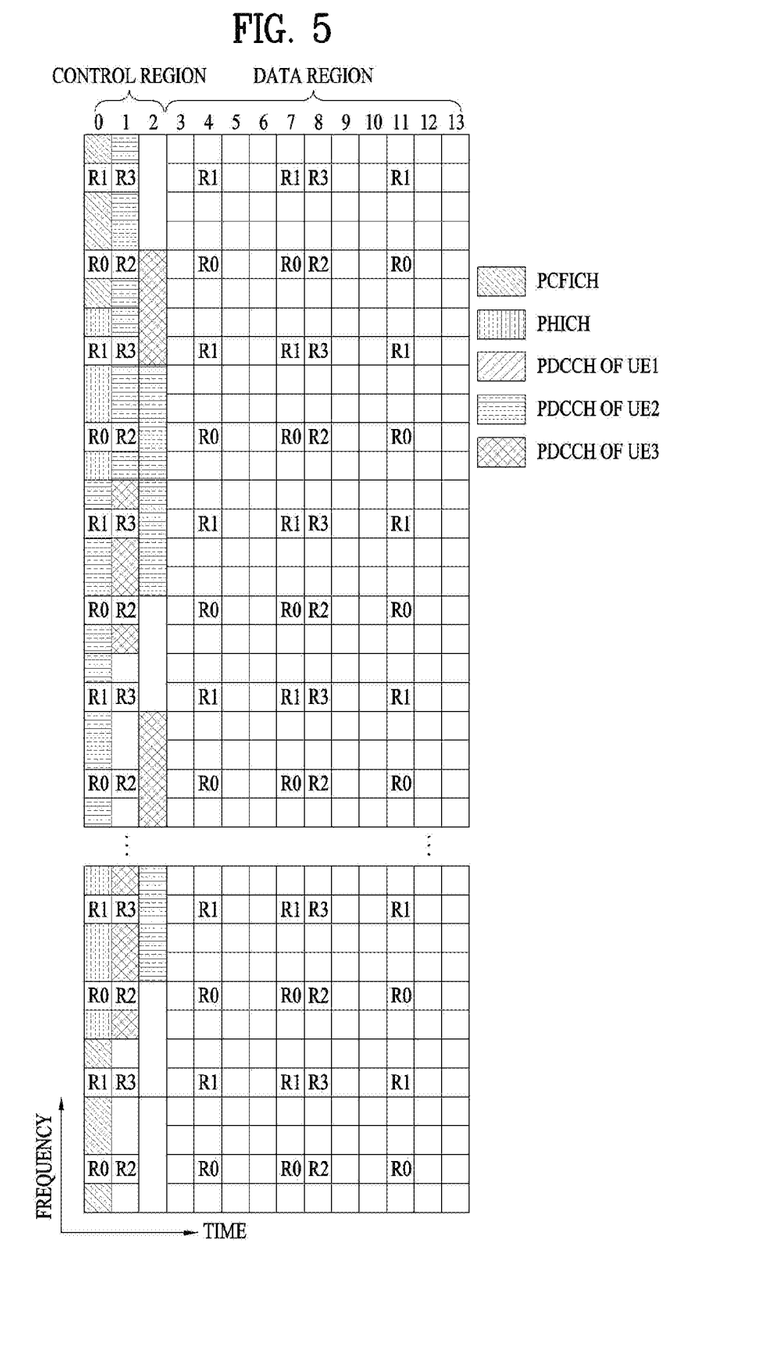
FIG. 5 is a diagram illustrating the structure of a DL radio frame used in an LTE system.

FIG. 5 is a diagram illustrating control channels included in a control region of one subframe in a DL radio frame.

Referring to FIG. 5, one subframe includes 14 OFDM symbols. The first to third ones of the 14 OFDM symbols may be used as a control region and the remaining 11 to 13 OFDM symbols may be used as a data region, according to subframe configuration. In FIG. 5, R0 to R3 represent reference signals (RSs) or pilot signals for antennas 0 to 3, respectively. The RSs are fixed to a predetermined pattern within the subframe irrespective of the control region and the data region. Control channels are allocated to resources unused for RSs in the control region. Traffic channels are allocated to resources unused for RSs in the data region. The control channels allocated to the control region include a physical control format indicator channel (PCFICH), a physical hybrid-ARQ indicator channel (PHICH), a physical downlink control channel (PDCCH), etc.

The PCFICH, physical control format indicator channel, informs a UE of the number of OFDM symbols used for the PDCCH in every subframe. The PCFICH is located in the first OFDM symbol and is configured with priority over the PHICH and the PDCCH. The PCFICH is composed of 4 resource element groups (REGs) and each of the REGs is distributed over the control region based on a cell ID. One REG includes 4 resource elements (REs). An RE indicates a minimum physical resource defined as one subcarrier by one OFDM symbol. The PCFICH value indicates values of 1 to 3 or values of 2 to 4 depending on bandwidth and is modulated using quadrature phase shift keying (QPSK).

The PHICH, physical hybrid-ARQ indicator channel, is used to carry a HARQ ACK/NACK signal for UL transmission. That is, the PHICH indicates a channel through which DL ACK/NACK information for UL HARQ is transmitted. The PHICH includes one REG and is cell-specifically scrambled. The ACK/NACK signal is indicated by 1 bit and is modulated using binary phase shift keying (BPSK). The modulated ACK/NACK signal is spread with a spreading factor (SF) of 2 or 4. A plurality of PHICHs mapped to the same resource constitutes a PHICH group. The number of PHICHs multiplexed to the PHICH group is determined depending on the number of spreading codes. The PHICH (group) is repeated three times to obtain diversity gain in the frequency domain and/or the time domain.

The PDCCH is allocated to the first n OFDM symbols of a subframe. In this case, n is an integer equal to or greater than 1, indicated by the PCFICH. The PDCCH is composed of one or more control channel elements (CCEs). The PDCCH informs each UE or UE group of information associated with resource allocation of transmission channels, that is, a paging channel (PCH) and a downlink shared channel (DL-SCH), UL scheduling grant, HARQ information, etc. The PCH and the DL-SCH are transmitted through a PDSCH. Therefore, the eNB and the UE transmit and receive data through the PDSCH except for particular control information or service data.

Information indicating to which UE or UEs PDSCH data is to be transmitted and information indicating how UEs should receive and decode the PDSCH data are transmitted on the PDCCH. For example, assuming that a cyclic redundancy check (CRC) of a specific PDCCH is masked by a radio network temporary identity (RNTI) 'A' and information about data transmitted using a radio resource 'B' (e.g. frequency location) and using DCI format 'C', i.e. transport format information (e.g. a transport block size, a modulation scheme, coding information, etc.), is transmitted in a specific subframe, a UE located in a cell monitors the PDCCH, i.e. blind-decodes the PDCCH, using RNTI information thereof in a search space. If one or more UEs having RNTI 'A' are present, the UEs receive the PDCCH and receive a PDSCH indicated by 'B' and 'C' based on the received information of the PDCCH.

Figure 6:
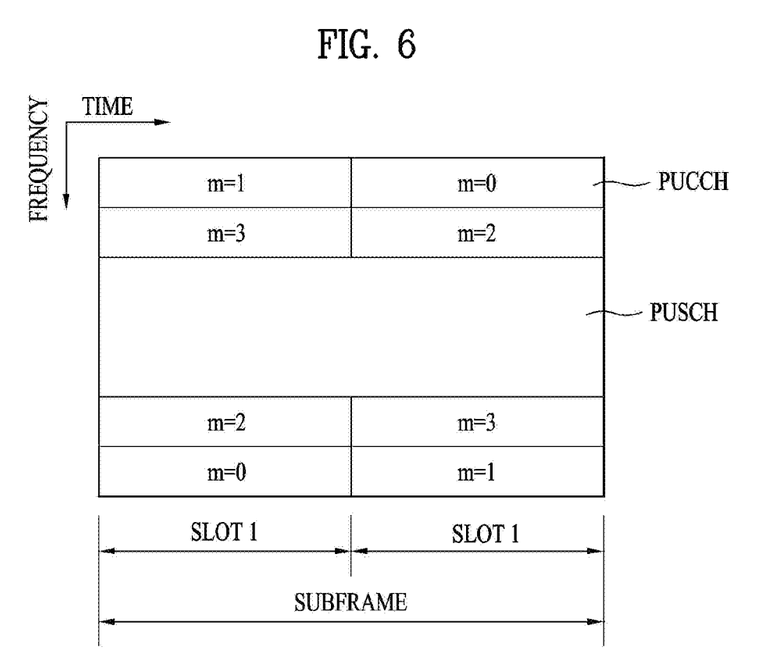
FIG. 6 is a diagram illustrating the structure of a UL subframe in an LTE system.

FIG. 6 is a diagram illustrating the structure of a UL subframe in an LTE system.

Referring to FIG. 6, an uplink subframe is divided into a region to which a PUCCH is allocated to transmit control information and a region to which a PUSCH is allocated to transmit user data. The PUSCH is allocated to the middle of the subframe, whereas the PUCCH is allocated to both ends of a data region in the frequency domain. The control information transmitted on the PUCCH includes an ACK/NACK, a channel quality indicator (CQI) representing a downlink channel state, an RI for Multiple Input and Multiple Output (MIMO), a scheduling request (SR) indicating a request for allocation of UL resources, etc. A PUCCH of a UE uses one RB occupying different frequencies in each slot of a subframe. That is, two RBs allocated to the PUCCH frequency-hop over the slot boundary. Particularly, PUCCHs for m=0, m=1, m=2, and m=3 are allocated to a subframe in FIG. 6.

In the present invention, a method for reinforcing reliability in HARQ operation for recovering a packet error when the packet error occurs in a multicast operation for receiving a signal transmitted from a transmitter in a plurality of receivers.

Particularly, the present invention may be applied to communication technology for a next generation communication system, which requires high reliability and low latency, such as a vehicle control signal to be transmitted to an autonomous vehicle. For example, the legacy communication system aims to obtain a block error rate (BLER) of 10-2 which is conventionally considered, whereas the next generation communication system aims to obtain BLER<<10-2, for example, BLER of 10-5, which may require very high reliability. Also, since this service requires very low latency, successful transmission and reception should be completed within a very short restrictive time.

Although the following description is based on a downlink where a transmitter is an eNB and a transmitter is a UE, the description is applicable to an uplink where the UE is a transmitter and the eNB is a receiver or device-to-device (D2D) communication for directly transmitting data from a UE to another UE.

First of all, the transmitter transmits multicast data and the receiver which has received the multicast data reports HARQ-ACK to the transmitter. This is helpful for improvement of reliability. This is because that the transmitter may retransmit corresponding data if even one receiver fails in data decoding. However, since a plurality of receivers attempt to receive the same data, the same decoding results do not occur, and a problem that HARQ feedback is transmitted from the corresponding receiver should be solved properly. Although an independent resource may be used for an individual receiver, this causes excessive resource consumption. On the other hand, if receivers which attempt to receive the same data use a single HARQ feedback resource together, it is advantageous in that resource consumption may be reduced.

Also, since the decoding results of the respective receivers are different from each other, if each decoding result is transmitted to a resource shared by the respective receivers, normal transmission cannot be performed. As a method for solving this, the receiver which has failed in decoding transmits NACK signal, whereas the receiver which has successfully performed decoding may be operated so as not to transmit any signal. In this case, the transmitter may identify whether at least one receiver has failed in decoding or all receivers have successfully performed decoding.

However, this operation has a drawback in that it cannot identify decoding failure of a scheduling message for scheduling multicast data. If a specific receiver fails in decoding of the scheduling message, the receiver determines that there is no transmission of corresponding data and will not transmit HARQ feedback signal. If the other receivers have successfully performed reception, no HARQ feedback signal is not transmitted. Therefore, since the transmitter determines that all receivers have successfully performed reception and does not attempt retransmission, the receiver which has failed in decoding of the scheduling message cannot receive the corresponding data again.

To solve this problem, the present invention suggests a method for notifying a transmitter whether decoding of a scheduling message for scheduling multicast data has been successfully performed.

First of all, the transmitter and the receiver configure a set of time and/or frequency resources, to which a scheduling message for scheduling a specific service may be transmitted. Additionally, the scheduling message for scheduling a specific service may previously be determined by several transmission parameters. Examples of the transmission parameter include CRC mask, scrambling sequence generation parameter, and DM-RS sequence generation parameter. A receiver which attempts to receive a specific service attempts to receive a scheduling message by using a corresponding parameter in a corresponding resource set.

If the receiver fails to receive a multicast scheduling message in a specific time and/or frequency resource, the receiver generates a signal indicating this reception failure and notifies the transmitter of the generated signal. Hereinafter, this signal will be referred to as control-NACK, while a signal transmitted during reception failure of multicast data will be referred to as data-NACK. It is assumed that a scheduling message corresponding to data-NACK has been received to transmit the data-NACK.

A resource for control-NACK may be detached from a resource for data-NACK. If control-NACK has not been received but data-NACK has been received, the transmitter may identify that all receivers have normally received a scheduling message and thus information related to the received data has been stored in a soft buffer of all receivers although an error has occurred. Therefore, even though retransmission is performed using smaller time/frequency/power, all receivers may normally complete decoding through combination with information stored therein. On the other hand, if control-NACK is received, since it means that a specific receiver does not store any information, the specific receiver may be operated to use a sufficient resource such that desired decoding performance may be obtained by retransmission only.

Alternatively, the specific receiver may be operated such that the control-NACK and the data-NACK use the same resource, that is, a common resource. In this case, the resource of the data-NACK cannot be designated by a scheduling message, and a use of a specific resource may previously be scheduled between the transmitter and the receiver through a separate channel or higher layer signaling. The receiver transmits the control-NACK and the data-NACK by using the corresponding resource without identifying them from each other. This method has an advantage in that HARQ-ACK resource consumption may be reduced.

If there are no multicast data to be transmitted through a resource set which is previously designated, the transmitter may not transmit a scheduling message. In this case, since all receivers will transmit the control-NACK, a signal of a too high power is transmitted to the corresponding resource, whereby the signal may act on another communication as interference. To avoid interference, the transmitter may be operated to transmit a specific scheduling message from a corresponding resource set but the corresponding scheduling message does not schedule multicast data. In another sense, the transmitter may be operated to indicate that there is no transmission of multicast data. Particularly, the corresponding scheduling message is characterized in that a size of frequency and/or time resource, which is scheduled, becomes 0.

Meanwhile, if reliability of a very high level should be provided, at least a certain number of repetitive transmission or retransmission times may be performed. In this case, the transmitter performs a certain number of repetitive transmission or retransmission times regardless of a feedback of the receiver. At this time, the receiver may reduce unnecessary interference by allowing transmission prior to a corresponding number of times not to be performed even in case of occurrence of the control-NACK or the data-NACK.

Additionally, when the receiver transmits HARQ feedback, the receiver may configure a transmission power of control-NACK differently from a transmission power of the data-NACK. For example, since sufficient retransmission is required if a scheduling message is not received, the receiver may configure a higher power of the control-NACK such that an error of the control-NACK may be reduced and retransmission may start as soon as possible. Alternatively, as described above, if the transmitter does not transmit the scheduling message because there are no multicast data to be transmitted, a higher power of the data-NACK may be configured to reduce interference.

A power for transmitting HARQ feedback of multicast may be controlled in accordance with retransmission times of corresponding data. If there is no retransmission or exists a small number of retransmission times, since it is likely that relatively many receivers fail in reception, HARQ feedback transmission power of an individual receiver may be reduced, whereby interference may be reduced. Even in this case, a final signal generated by a sum of signals of several receivers may be received with safety by the transmitter.

However, since only a small number of receivers fail in reception with respect to transmission occurring after a lot of retransmission times are performed, it may be preferable to transmit HARQ feedback at a high power. For example, HARQ feedback transmission power may be configured by an increase function for retransmission times of corresponding data transmission. To this end, already generated retransmission times may be included in the scheduling message.

Figure 7:
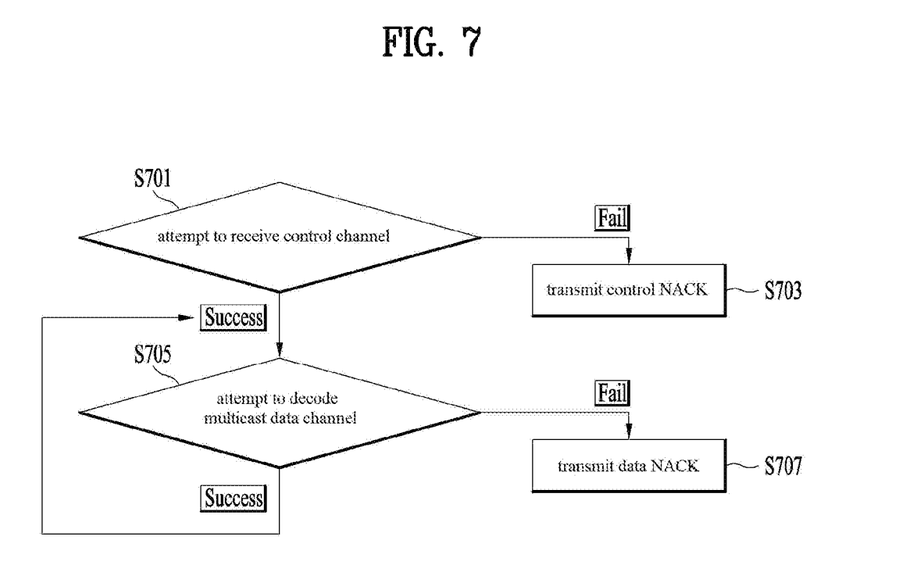
FIG. 7 is a diagram illustrating a flow chart of a method for receiving a multicast channel in accordance with the embodiment of the present invention.

FIG. 7 is a diagram illustrating a flow chart of a method for receiving a multicast channel in accordance with the embodiment of the present invention.

Referring to FIG. 7, in step 701, a UE attempts to receive a control signal for scheduling a multicast signal from a network. If reception of the control signal is failed, the UE transmits a control NACK signal, that is, control-NACK to the network as shown in step 703. In this case, the control signal may include information indicating absence of a multicast channel transmitted from the network. Therefore, all UEs may be prevented from transmitting the control NACK signal. Particularly, if reliability of a very high level should be provided, it is preferable that the control NACK signal is transmitted after retransmission of the multicast signal is performed as much as a preset number of times.

If the control signal is successfully received, the UE performs decoding on the basis of the control signal by receiving the multicast signal from the network in step 705. If decoding of the multicast signal is failed, the UE transmits a data NACK signal, that is, data-NACK to the network in step 707. Particularly, the data NACK signal and the control NACK signal may be fed back using the same resource. Also, if reliability of a very high level should be provided, it is preferable that the data NACK signal is transmitted after retransmission of the multicast signal is performed as much as a preset number of times in the same manner as the control NACK signal.

Additionally, it may be preferable that a higher power of the control NACK signal than that of the data NACK signal is configured such that retransmission may start as soon as possible. Also, if there is no retransmission or exists a small number of retransmission times, since it is likely that relatively many receivers fail in reception, it is preferable that the transmission powers of the control NACK signal and the data NACK signal are increased in accordance with retransmission times of the multicast signal.

Figure 8:
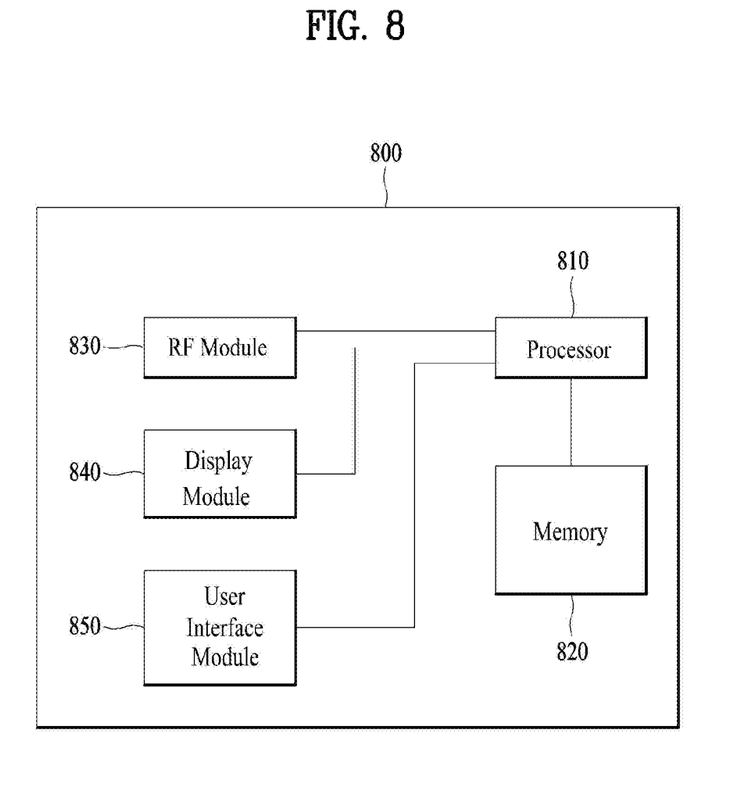
FIG. 8 is a block diagram of a communication apparatus according to an embodiment of the present invention.

FIG. 8 is a block diagram of a communication apparatus according to an embodiment of the present invention.

Referring to FIG. 8, a communication apparatus 800 includes a processor 810, a memory 820, a Radio Frequency (RF) module 830, a display module 840 and a user interface module 850.

The communication apparatus 800 is shown for convenience of description and some modules thereof may be omitted. In addition, the communication apparatus 800 may further include necessary modules. In addition, some modules of the communication apparatus 800 may be subdivided. The processor 810 is configured to perform an operation of the embodiment of the present invention described with respect to the drawings. For a detailed description of the operation of the processor 810, reference may be made to the description associated with FIGS. 1 to 7.

The memory 820 is connected to the processor 810 so as to store an operating system, an application, program code, data and the like. The RF module 830 is connected to the processor 810 so as to perform a function for converting a baseband signal into a radio signal or converting a radio signal into a baseband signal. The RF module 830 performs analog conversion, amplification, filtering and frequency up-conversion or inverse processes thereof. The display module 840 is connected to the processor 810 so as to display a variety of information. As the display module 840, although not limited thereto, a well-known device such as a Liquid Crystal Display (LCD), a Light Emitting Diode (LED), or an Organic Light Emitting Diode (OLED) may be used. The user interface module 850 is connected to the processor 810 and may be configured by a combination of well-known user interfaces such as a keypad and a touch screen.

The above-described embodiments are proposed by combining constituent components and characteristics of the present invention according to a predetermined format. The individual constituent components or characteristics should be considered to be optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed. Some components or characteristics of any embodiment may also be included in other embodiments, or may be replaced with those of the other embodiments as necessary. Moreover, it will be apparent that some claims referring to specific claims may be combined with other claims referring to the other claims other than the specific claims to constitute the embodiment or add new claims by means of amendment after the application is filed.

The above-mentioned embodiments of the present invention are disclosed on the basis of a data communication relationship between a base station and a user equipment. Specific operations to be conducted by the base station in the present invention may also be conducted by an upper node of the base station as necessary. In other words, it will be obvious to those skilled in the art that various operations for enabling the base station to communicate with the user equipment in a network composed of several network nodes including the base station will be conducted by the base station or other network nodes than the base station. The term "Base Station" may be replaced with the terms fixed station, Node-B, eNode-B (eNB), or access point as necessary.

The embodiments of the present invention can be implemented by a variety of means, for example, hardware, firmware, software, or a combination thereof. In the case of implementing the present invention by hardware, the present invention can be implemented through application specific integrated circuits (ASICs), digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. The software code may be stored in a memory unit so as to be driven by a processor. The memory unit may be located inside or outside of the processor, so that it can communicate with the aforementioned processor via a variety of well-known parts.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

Although the method for receiving a multicast signal in a wireless communication system and the apparatus therefor have been described based on the 3GPP LTE system, the method and the device are applicable to various wireless communication systems in addition to the 3GPP LTE system.

The invention claimed is:

1. A method of receiving a multicast signal by a user equipment (UE) in a wireless communication system, the method comprising:
   receiving, from a network, information regarding a common resource for transmitting a data negative acknowledgement (NACK) signal and a control NACK signal;
   monitoring a control signal from the network for scheduling a multicast signal;
   receiving the multicast signal from the network by performing decoding of the multicast signal based on the control signal, based on reception of the control signal being successful; and
   transmitting the data NACK signal to the network based on the decoding of the multicast signal having failed,
   wherein the control NACK signal is transmitted to the network based on the reception of the control signal having failed,
   wherein the common resource is used for transmitting at least one of the data NACK signal or the control NACK signal.

2. The method according to claim 1, wherein the control signal includes information indicating absence of a multicast channel transmitted from the network.

3. The method according to claim 1, wherein the control NACK signal and the data NACK signal are transmitted to the network after retransmission of the multicast signal is performed as much as a preset number of times.

4. The method according to claim 1, wherein a transmission power of the control NACK signal is configured to be higher than that of the data NACK signal.

5. The method according to claim 1, wherein transmission powers of the control NACK signal and the data NACK signal are increased in accordance with retransmission times of the multicast signal.

6. A user equipment (UE) configured to operate in a wireless communication system, the UE comprising:
   a wireless communication module; and
   a processor configured to control the wireless communication module,
   wherein the processor is configured to:
   receive, from a network, information regarding a common resource for transmitting a data negative acknowledgement (NACK) signal and a control NACK signal;
   monitor a control signal from the network for scheduling a multicast signal;
   receive the multicast signal from the network by performing decoding of the multicast signal based on the control signal, based on reception of the control signal being successful; and
   transmit the data NACK signal to the network based on the decoding of the multicast signal having failed,
   wherein the processor transmits the control NACK signal to the network based on the reception of the control signal having failed,
   wherein the common resource is used for transmitting at least one of the data NACK signal or the control NACK signal.

7. The UE according to claim 6, wherein the control signal includes information indicating absence of a multicast channel transmitted from the network.

8. The UE according to claim 6, wherein the processor transmits the control NACK signal and the data NACK signal to the network after retransmission of the multicast signal is performed as much as a preset number of times.

9. The UE according to claim 6, wherein the processor configures a transmission power of the control NACK signal to be higher than that of the data NACK signal.

10. The UE according to claim 6, wherein the processor increases transmission powers of the control NACK signal and the data NACK signal in accordance with retransmission times of the multicast signal.

11. A processing apparatus configured to control a user equipment (UE) to receive a multicast signal in a wireless communication system, the processing apparatus comprising:
- at least one processor; and
- at least one computer memory operably connected to the at least one processor and storing instructions that, based on being executed by the at least one processor, perform operations comprising:
  - receiving, from a network, information regarding a common resource for transmitting a data negative acknowledgement (NACK) signal and a control NACK signal;
  - monitoring a control signal from the network for scheduling a multicast signal;
  - receiving the multicast signal from the network by performing decoding of the multicast signal based on the control signal, based on reception of the control signal being successful; and
  - transmitting the data NACK signal to the network based on the decoding of the multicast signal having failed,
  - wherein the control NACK signal is transmitted to the network based on the reception of the control signal having failed,
  - wherein the common resource is used for transmitting at least one of the data NACK signal or the control NACK signal.

* * * * *